(12) United States Patent
Weiss et al.

(10) Patent No.: US 6,284,825 B1
(45) Date of Patent: Sep. 4, 2001

(54) SOLUTIONS OF AMINOTRIAZINE RESINS IN MONOALKYLGLYCOLS

(75) Inventors: Wolfram Weiss, Mutterstadt; Gerhard Fischer, Dirmstein; Manfred Niessner, Schifferstadt; Werner Schnurr, Herxheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/381,969

(22) PCT Filed: Mar. 18, 1998

(86) PCT No.: PCT/EP98/01551

§ 371 Date: Oct. 1, 1999

§ 102(e) Date: Oct. 1, 1999

(87) PCT Pub. No.: WO98/45354

PCT Pub. Date: Oct. 15, 1998

(30) Foreign Application Priority Data

Apr. 4, 1997 (DE) ................................. 197 14 015

(51) Int. Cl.$^7$ ................. C09D 161/32; C09D 161/26
(52) U.S. Cl. ............... 524/376; 524/512; 524/541; 524/597; 524/598
(58) Field of Search ................... 524/376, 541, 524/512, 597, 598

(56) References Cited

U.S. PATENT DOCUMENTS 5,114,993 * 5/1992 Scherpling ..................... 523/409

* cited by examiner

*Primary Examiner*—Patricia A. Short
(74) *Attorney, Agent, or Firm*—Oblon, Spivak, McClelland, Maier & Neustadt, P.C.

(57) ABSTRACT

Solutions of aminotriazine resins at least 30 mol % of whose alkylol groups are etherified with a $C_1$–$C_{16}$ alkanol in a mono-$C_1$–$C_4$ alkyl glycol of the formula $$R^1-O-(R^2-O-)_w(R^3-O-)_x(R^2-O-)_y(R^3-O-)_z H. \quad I$$

where $R^1$ is $C_1$–$C_4$ alkyl, $R_2$ is $CH_2$—$CH_2$ and $R^3$ is

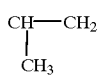

and w, x, y and z are an integer from 0 to 10 and at least one of them is other than 0 or in a solvent mixture which consists to the extent of at least 20% by weight a of mono-$C_1$–$C_4$ alkyl glycol of the above formula.

5 Claims, No Drawings

SOLUTIONS OF AMINOTRIAZINE RESINS IN MONOALKYLGLYCOLS

The invention relates to solutions of aminotriazine resins at least 30 mol % of whose alkylol groups are etherified with a $C_1$–$C_{16}$ alkanol in a mono-$C_1$–$C_4$ alkyl glycol of the formula

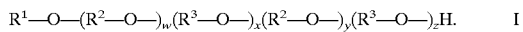   I where $R^1$ is $C_1$–$C_4$ alkyl, $R_2$ is $CH_2$—$CH_2$ and $R^3$ is

and w, x, y and z are an integer from 0 to 10 and at least one of them is other than 0
or in a solvent mixture which consists to the extent of at least 20% by weight of a mono-Cl-$C_4$ alkyl glycol of the above formula.

The invention additionally relates to the use of the solutions as curing agents in coating compositions.

Amino resins are known to be used as curing agents for polymer binders, especially for those having hydroxyl groups. In such cases the amino resins are generally in the form of a solution.

DE-A-2414426 and DE-A-2824473 disclose melamine resins in which the alkylol groups have been etherified with a tonoalkyl glycol. Excess monoalkyl glycol is removed from the solution of the melamine resins by distillation.

A general desire is that the amino resin solutions used as curing agents should not bring about too great an increase in viscosity, especially that of aqueous coating compositions. At the same time, the proportion of volatile organic solvents in aqueous coating compositions should of course be as small as possible.

It is an object of the present invention, therefore, to provide amino resin solutions which when added to aqueous coating compositions bring about virtually no increase in the viscosity and in the content of volatile organic solvents.

We have found that this object is achieved by the above-defined solutions and their use.

The aminotriazine resin which is a constituent of the solution is a product of the reaction of aldehydes, for example glyoxal, furfural and, preferably, formaldehyde, with aminotriazines, for example benzoguanamine, acetoguanamine and, preferably, melamine.

Particular preference is given to reaction products of melamine and formaldehyde.

In the course of the reaction of the aldehyde, especially formaldehyde, the amino groups of the aminotriazines are alkylolated, especially methylolated; in other words, the hydrogens of the amino groups are replaced by alkylol groups. Preferably more than 30%, in particular more than 50%, of the hydrogens are replaced by alkylol groups. As a result, for example, of condensation reactions of the alkylol groups, the aminotriazine resins may comprise a plurality of aminotriazine rings. They preferably include on average from 1 to 20 aminotriazine rings.

The remaining alkylol groups are preferably etherified, extensively or completely, with $C_1$- to $C_{16}$-alkanols. Such alkanols are preferably butanol or mixtures thereof with a minor amount of methanol. In total at least 30 mol %, preferably at least 50 mol %, of the original (that is, present prior to etherification and condensation reactions) alkylol groups are etherified with Cl-Cl6 alkanols. Preferably not more than just 5 mol %, in particular not more than 1 mol % (and preferably none) of the alkylol groups is etherified with other alcohols.

The amino resins are preferably insoluble in water.

The dilution number of the amino resins is preferably less than 20 and, with particular preference, less than 5, in particular less than 2 or 1 g. The dilution number is a measure of how much hydrophilic solvent can be admixed to an amino resin without the resulting solution becoming cloudy.

The dilution number is determined by the following method:

1 g of amino resin is placed in a 25 ml test tube. Then water in 0.5 g portions is added at 23° C. After each portion is added the tube is shaken and observed to ascertain whether, after shaking, the result is cloudiness or phase separation (incompatibility). The amount, in g, of water added before incompatibility occurs is the dilution number.

The aminotriazine resins are in solution in an organic solvent. The solvent is a mono-$C_1$–$C_4$ alkyl glycol of the formula I, or a mixture of such compounds, or is a solvent mixture which consists to the extent of at least 20% by weight, preferably at least 50% by weight and, with particular preference, at least 70% by weight, based on the solvent mixture, of the mono-$C_1$–$C_4$ alkyl glycols of the formula I.

In the formula I $R^1$ is preferably n-butyl. The sum w+x+y+z is preferably from 1 to 10, particularly preferably from 1 to 5 and, with very particular preference, from 1 to 3. The compound of the formula I can comprise as alkylene oxide groups exclusively ethylene oxide groups ($R^2$—O) or propylene oxide groups ($R^3$—O). However, the compounds can also comprise copolymers 15
where
w,x≠0 and y, z=0 or
x,y≠0 and w, z=0 or
w,x,y≠0 and z=0 or
x,y,z≠0 and w=0.
Preferably, w≠0 and x, y, z=0.
Examples of preferred compounds are:
butyl glycol ($R^1$=butyl; w=1; x, y, z=0)
butyl di-, tri- or tetraglycol ($R^1$=butyl, w=2, 3 or 4, x, y, z=0)
propylene glycol monomethyl ether ($R^1$=methyl, x=1, w, y, z=0)
dipropylene glycol monomethyl ether ($R^1$=methyl, x=2, w, y, z=0)
and particular preference is given to butyl glycol and butyl diglycol.

The aminotriazine resins are generally prepared in an organic solvent; for example, the alcohol with which the alkylol groups are etherified is usually employed in excess and used simultaneously as solvent.

To prepare the novel solutions it is therefore possible, for example, to perform a solvent exchange in which the original solvent is removed to the desired extent and mono-$C_1$–$C_4$ alkyl glycols are added to the desired extent.

The novel solution is suitable as a curing agent in coating compositions.

Coating compositions comprise a polymeric binder with or without further additives such as pigments, dyes, leveling agents, thickeners, etc.

The polymeric binder can be crosslinked, i.e. cured, with amino resins because of its content of active hydrogen (OH, NH, SH groups).

Examples of suitable binders are alkyd, polyester, epoxy and polyurethane resins and also free-radical polymers based on acrylates, vinyl esters, dienes and vinylaromatic compounds, or mixtures thereof.

Preference is given to free-radical addition polymers, condensation polymers or polyaddition polymers having OH groups, preferably with a hydroxyl number of from 20 to 200 mg of KOH/g (in accordance with DIN 53240).

The binders and therefore the coating compositions as well can be in the form, for example, of solutions in water or organic solvent or in the form of aqueous dispersions.

The novel solutions are suitable as curing agents both for aqueous coating compositions and for coating compositions in organic solvents.

When used in aqueous coating compositions, there is little if any increase in viscosity.

The comparison below makes it clear that the addition of a melamine resin diluted in accordance with the invention leads to a lower viscosity of the coating material for a given content of volatile organic solvents.

EXAMPLES

Amino Resins

A1 (for comparison)

Luwipal® LR 8891 (butylated, partially alkylated melamine resin in n-butanol, solids content 70%)

A2

250 ml of butanol are distilled off under reduced pressure (50 mbar) from 1000 g of Luwipal® LR 8891. The resulting resin is subsequently adjusted with 170 g of butyl glycol to a viscosity of about 4500 mPa·s. The batch is then filtered. The end product has a solids content of 70% (ISO 3251 2 h/125° C. 2 ml of n-butanol) with a viscosity of 4.8 mPa·s (ISO 3219/B) and a butyl glycol content of 18%.

Coating Materials:

Example 1

In a 150 ml polyethylene beaker, 45 g of a 55% strength solution of polyester resin in 16.5% butylglycol, 6.8% isobutanol, 18% water and 3.7% dimethylethanolamine (Bayhydrol® D 155), having a hydroxyl content (solvent-free) of 1.5 and an acid number (solvent-free) of 45 mg of KOH/g, are mixed with 15 g of the 70% strength melamine resin solution A2 and then the mixture is converted by stirring with 57 g of water into an emulsion, using a laboratory stirrer with a dissolver disk. The rotational speed is 500–1000 rpm. The result is a 30% strength aqueous polyester coating material having a pH (glass electrode) of 7.9 and a viscosity (Brookfield, spindle 3, 10 rpm) of 1.9 Pas at 23° C.

Comparison

The procedure of the Example is repeated but using, rather than the 70% strength melamine resin solution A2, the 70% strength melamine resin solution A1 dissolved purely in butanol. The resulting 30% strength aqueous polyester coating material has a pH of 8.2 and a viscosity of 5.6 Pas.

We claim:

1. A process for preparing an aqueous curable coating composition, which comprises adding a solution comprising a water-insoluble aminotriazine resin at least 30 mol % of whose alkylol groups are etherified with n-butanol in a mono-$C_1$-$C_4$ alkyl glycol of the formula $$R^1\text{—}O\text{—}(R^2\text{—}O\text{—})_w(R^3\text{—}O\text{—})_x(R^2\text{—}O\text{—})_y(R^3\text{—}O\text{—})_zH \qquad I$$

where $R^1$ is $C_1$-$C_4$ alkyl, $R_2$ is $CH_2$—$CH_2$ and $R^3$ is

and w, x, y and z are an integer from 0 to 10 and at least one of them is other than 0, or in a solvent mixture which comprises at least 50% by weight of a mono-$C_1$-$C_4$ alkyl glycol of the above formula, as a curing agent, to the aqueous coating composition.

2. The process of claim 1, wherein the aminotriazine resin has a dilution number less than 20 g.

3. The process of claim 2, wherein the aminotriazine resin has a dilution number less than 5 g.

4. The process of claim 3, wherein the aminotriazine resin has a dilution number less than 2 g.

5. The process of claim 4, wherein the aminotriazine resin has a dilution number less than 1 g.

* * * * *